United States Patent

[11] 3,623,790

| [72] | Inventors | Stanley A. Buckstad<br>San Jose, Calif.;<br>Woodrow L. Hayes, Rye, N.H. |
|---|---|---|
| [21] | Appl. No. | 889,366 |
| [22] | Filed | Dec. 31, 1969 |
| [45] | Patented | Nov. 30, 1971 |
| [73] | Assignee | Singer-General Precision, Inc.<br>Binghamton, N.Y. |

[54] CAPACITANCE CONTROLLED AUTOMATIC FOCUSING SYSTEM
3 Claims, 2 Drawing Figs.

[52] U.S. Cl. .................................................. 350/46,
95/45, 324/61 S, 340/200, 350/84, 355/55
[51] Int. Cl. ...................................................... G02b 7/04
[50] Field of Search ........................................... 350/46, 84;
355/55; 353/101, 69; 95/44 R, 44 C, 45; 324/61 S;
340/200, 282

[56] References Cited
UNITED STATES PATENTS

| 2,747,152 | 5/1956 | Greene .......................... | 324/61 S |
| 3,090,896 | 5/1963 | Bowden et al. ................ | 340/200 |
| 3,217,204 | 11/1965 | Nance ........................... | 324/61 S |
| 3,493,764 | 2/1970 | Craig ............................. | 353/101 |

FOREIGN PATENTS

| 985,426 | 3/1965 | Great Britain ................ | 324/61 S |

Primary Examiner—David Schonberg
Assistant Examiner—Ronald J. Stern
Attorneys—Francis L. Masselle, William Grobman and Charles S. McGuire ABSTRACT: In those optical systems in which a lens is moved parallel to the film to either record information on the film or read information from the film, any variation in the distance between the film and the lens will degrade the optical focus. The disclosed embodiment of the present invention is a system for maintaining the distance from a lens to a film in such an optical arrangement constant. A metallic member is supported on the lens housing and the film is supported on a metallic table. The lens housing is mounted for movement by means of a servomotor toward and away from the film. The capacitance between the metallic member and the metallic table is sensed and a voltage proportional thereto is supplied to drive the servomotor to position the lens housing to maintain the capacitance constant.

PATENTED NOV 30 1971
3,623,790
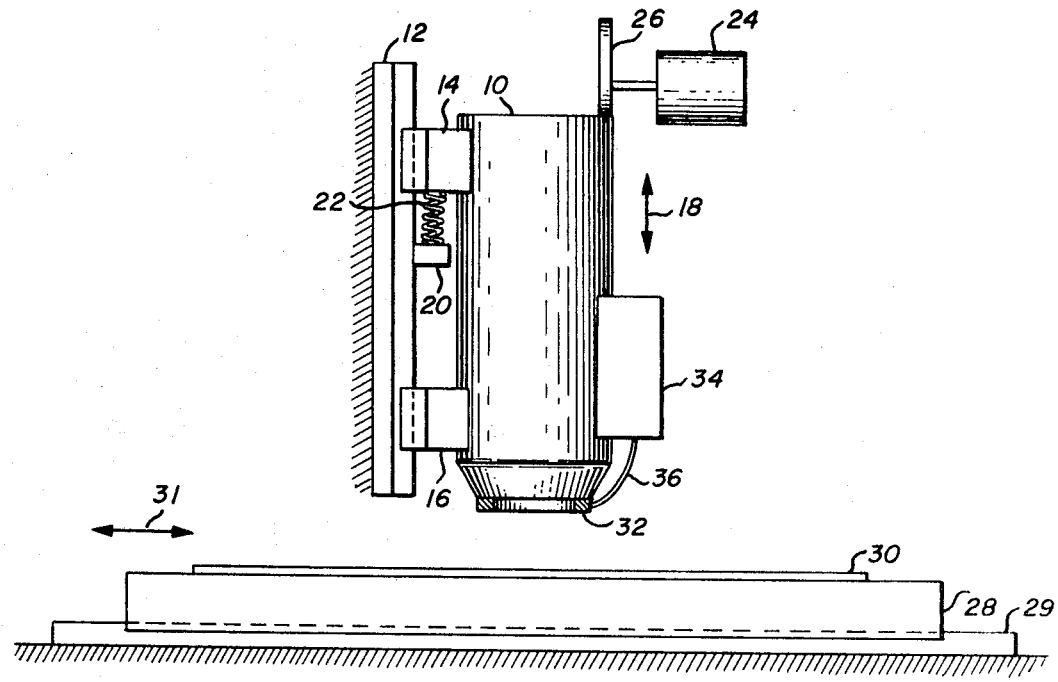
Fig_1
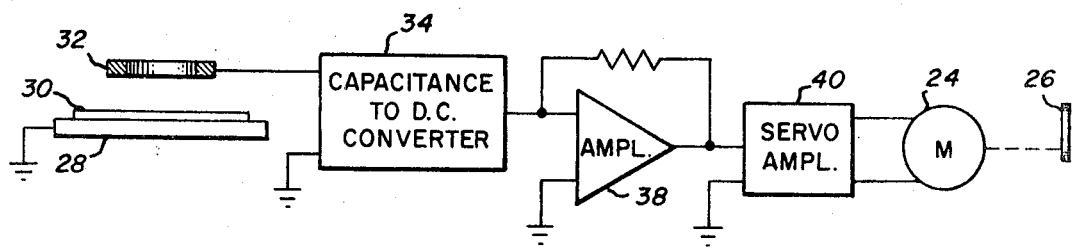
Fig_2
INVENTORS
STANLEY A. BUCKSTAD
BY WOODROW L. HAYES

3,623,790

CAPACITANCE CONTROLLED AUTOMATIC FOCUSING SYSTEM

This invention relates generally to an automatic lens focusing system, and more particularly for detecting a change in the distance between a lens and a film and altering the position of the lens accordingly to maintain the optics in focus on the film.

In various applications requiring either recording on film or reading from film, and wherein the lens is moved parallel to the plane of the film, extremely high mechanical accuracies are required to maintain the optical system in focus. However, such mechanical accuracies are not easily obtainable, and, if obtainable, such accuracies cannot be maintained in operation for various reasons. In such an optical system, a table for supporting a film is mounted for movement in one direction and an optical system including a focusing lens assembly is mounted for movement in a second direction orthogonal to the direction of movement of the table. The table and the optical system are mounted for movement on respective pairs of rails, for example, and supported thereon with bearings. If any foreign matter is present on such bearing surfaces, the table or optical system will be displaced in accordance with the dimension of such foreign matter. Furthermore, in systems which require relatively large film supporting tables, environmental conditions, such as temperature, may create distortions and changes in the dimensions of the mechanical parts. All these variations may result in a change in the distance between the focusing lens and the film, which will, in turn, degrade the focus of the optical system.

It can be readily appreciated that any device which requires contact with the film surface to gauge the distance thereto from the lens would not be desirable because of the possibility of damage to the film from such contact. Furthermore, such a contact device could only be employed outside the viewing or scanning area of the optical system.

It has been proposed to employ an air bearing effect to maintain the distance between the lens housing and the upper surface of the film constant. Such a proposal envisions the placement of a plurality of orifices around a lens housing which direct air into the surface of the film and support the lens housing on the resulting cushion of air therebetween. However, such a system necessitates the placement of the lens housing at a relatively small distance from the upper surface of the film. Any slight discontinuity in the upper surface of the film, therefore, may be scraped by the housing because of the relatively small distance from the housing to the majority of the film surface. It can be readily appreciated, of course, that any contact of the film housing with the film surface, even a relatively small portion thereof, is not desirable.

Accordingly, it is an object of the present invention to provide a system for maintaining the distance between a lens and a film substantially constant.

Another object of the present invention is to provide a system for maintaining the distance from a lens housing to a film substantially constant and wherein such distance is sufficient to insure that the lens housing does not contact the film surface.

These and other objects, features and advantages of the present invention will be more fully realized and understood from the following detailed description, when taken in conjunction with the accompanying drawing, wherein:

FIG. 1 is an elevational view of an optical station employing the system of the present invention; and FIG. 2 is a partial schematic and partial block diagram of a sensing and drive system constructed in accordance with the principles of the present invention.

Like reference numerals throughout the various views of the drawing are intended to designate the same elements.

With reference to FIG. 1, there is shown a lens housing 10 which is mounted on a rail 12 by means of shoes 14 and 16 for vertical movement as indicated by the double headed arrow 18. A stop 20 is secured to the rail 12 and a spring 22 is mounted between the stop 20 and the shoe 14 for biasing the housing 10 in an upward direction. The output shaft of a servomotor 24 is secured to a cam 26 which engages an upper surface of the housing 10 to move it in the desired direction indicated by the arrow 18. The entire optical assembly, including the rail 12 and the servomotor 24, are movable in a direction perpendicular to the plane of the drawing for purposes of either recording on or reading information from the film.

A metallic table 28 supports a film 30 thereon. The table 28 is mounted on a plurality of rails 29 for movement in a direction indicated by the double headed arrow 31. The optical system including the optics mounted in the housing 10 may be employed for either scanning the film 30 or recording information thereon. For example, a CRT mounted above the housing 10 may be employed for exposing the film 30. Likewise, a flying spot scanner mounted above the housing 10 may be employed for scanning information recorded on the film 30. It is to be understood, of course, that the optical system illustrated in FIG. 1 is diagrammatic and the drawing is not intended to illustrate all of the details of such an optical system since such details are not necessary for a complete understanding of the present invention.

The distance between the lens housing 10 and the table 28 is extremely critical in maintaining the optical system focused at the top surface of the film 30. Variations in this distance will, of course, cause a change in the focus, since the distance between the housing 10 and the upper surface of the film 30 will change if the film thickness has remained constant.

This problem is overcome by the present invention which employs a capacitance probe in a closed servoloop to alter the vertical position of the housing 10 in accordance with a change in the capacitance between the housing and the table 28. In particular, a metallic ring 32 is mounted at the lower end of the housing 10 and surrounds the optical path without causing any interference thereto. A capacitance measuring device 34 is mounted on the housing 10 and is electrically connected to the ring 32 by means of the cable 26. This device may be any of the well-known capacitance measuring devices, such as a capacitive bridge having a DC voltage output which is proportional to the capacitance. By proper selection of the parameters of the capacitance measuring device, the voltage output is zero at a finite value of measured capacitance corresponding to a particular distance between the ring 32 and the table 28. Such devices are well known in the art and do not require further definition herein.

As shown in FIG. 2, the output of the capacitance measuring device or converse 34 is connected to one input of an amplifier 38. An output of the amplifier 38 is connected to a input of a servoamplifier 40, the output of which is connected to the servomotor 24 which is mechanically coupled to the cam 26. The operation of the system can be better understood from an understanding of the capacitive nature of the dielectric volume between the ring 32 and the table 28.

Capacitance can be defined by the expression:
$$c = \epsilon(AK/D) \quad (1)$$
wherein,
C is the capacitance,
$\epsilon$ is the dielectric constant
A is the finite area of the smallest plate of a capacitor,
D is the distance between plates of a capacitor, and
K is the normalizing constant.

The capacitance between the ring 32 and the table 28 is equivalent to two capacitors in series. The total value of capacitance can, therefore, be defined by the expression:
$$C_T = (C_1 C_2 / C_1 + C_2) \quad (2)$$

If the subscript "1" is assigned to the dielectric volume between the ring 32 and the top surface of the film 30 and the subscript "2" is assigned to the dielectric volume of the film 30, then
$$C_1 = (\epsilon_1 AK/D_1), \text{ and} \quad (3)$$
$$C_2 = (\epsilon_2 AK/D_2) \quad (4)$$

Substituting expressions (3) and (4) into expression (2) results in the following expression:
$$C_T = (\epsilon_1 \epsilon_2 AK / \epsilon_1 D_2 + \epsilon_2 D_1). \quad (5)$$

The thickness of the film 30 is relatively uniform within less than a one percent difference across its entire extent. Therefore, the distance $D_2$ can be considered a constant. Since $\epsilon_1$, $\epsilon_2$, $A$ and $K$ are also constants, the only variable of any significance in expression (5) is the distance, $D_1$, from the ring 32 to the top of the film 30. Accordingly, the total capacitance $C_T$, is inversely proportional to the distance $D_1$. It can be readily appreciated, therefore, that any change in the distance $D_1$ will create an imbalance in the servoloop to drive the lens housing 10 in the required direction to offset the change.

In one working example of the system of the present invention, the following values were employed:

$\epsilon_1 = 1$
$\epsilon_2 = 5$
$A = 0.22$ square inch
$K = 0.225$
$D_1 = 0.00355$ inch
$D_2 = 0.007$ inch, which produced a value of capacitance, $C_T$, equal to 10 pF. A one percent change in the total capacitance, $C_T$, was well beyond the minimum signal (400 millivolts) required for correction by the servoloop illustrated in FIG. 2. A slightly less than one percent change in total capacitance, $C_T$, corresponds to a one percent change in the distance, $D_1$. Therefore, changes in $D_1$ in the above example of 0.000035 inch were correctable by the system.

The invention claimed is:

1. A system for maintaining a constant distance between an optical lens, along the optical axis thereof, and the surface of a film having substantially uniform thickness, said system comprising:
   a. an essentially flat support of electrically conducting material on which the film is placed;
   b. bearing means on which said support is mounted for lateral movement;
   c. a lens housing supporting the optical lens;
   d. mounting means upon which said housing is supported for movement toward and away from said support along the optical axis of the lens and substantially orthagonal to the direction of said lateral movement;
   e. an electrically conducting ring mounted on one end of said housing in facing relation to said support and concentrically encircling the optical axis of the lens;
   f. means for sensing the total capacitance between said conducting ring and said support with the film therebetween;
   g. means for developing a DC signal commensurate with said total capacitance; and
   h. servomotor means constructed and arranged to move said housing upon said mounting means in response to said DC signal.

2. The invention according to claim 1 wherein capacitance sensing means and signal developing means are so constructed that said DC signal is zero when said total capacitance is equal to a predetermined value corresponding to a particular distance between said ring and said support.

3. The invention according to claim 6 wherein said motor means is arranged to move said housing by a cam mounted on the motor shaft.

* * * * *